US008398051B2

(12) United States Patent
Grimseth et al.

(10) Patent No.: US 8,398,051 B2
(45) Date of Patent: Mar. 19, 2013

(54) GATE VALVE ACTUATOR AND METHOD (75) Inventors: Tom Grimseth, Oslo (NO); Tom Kjønigsen, Sandnes (NO); Christian Borchgrevink, Langhus (NO); Jon Flidh, Mjøndalen (NO)

(73) Assignee: Vetco Gray Scandinavia AS, Sandvika (NO)

(*) Notice: Subject to any disclaimer, the term of this patent is extended or adjusted under 35 U.S.C. 154(b) by 180 days.

(21) Appl. No.: 12/918,933

(22) PCT Filed: Feb. 18, 2009

(86) PCT No.: PCT/IB2009/000285
§ 371 (c)(1),
(2), (4) Date: Nov. 29, 2010

(87) PCT Pub. No.: WO2009/104072

PCT Pub. Date: Aug. 27, 2009

(65) Prior Publication Data

US 2011/0068287 A1    Mar. 24, 2011

(30) Foreign Application Priority Data

Feb. 21, 2008  (NO) .................................. 20080909

(51) Int. Cl.
*F16K 31/44* (2006.01)
(52) U.S. Cl. .......................................... 251/69; 251/68
(58) Field of Classification Search ............... 251/54, 251/55, 68, 69
See application file for complete search history.

(56) References Cited

U.S. PATENT DOCUMENTS

| 2,962,036 A | 11/1960 | Collins |
| 3,324,741 A | 6/1967 | Anderson |
| 3,512,421 A | 5/1970 | Anderson |
| 4,619,320 A * | 10/1986 | Adnyana et al. ............. 166/66.7 |

(Continued)

FOREIGN PATENT DOCUMENTS

| GB | 2383627 A | 7/2003 |
| NO | 320936 B1 | 2/2006 |

OTHER PUBLICATIONS

PCT/ISA/210—International Search Report—Jun. 4, 2009.
PCT/IPEA/409—International Preliminary Report on Patentability—May 26, 2010.
Norwegian Search Report—Jul. 24, 2008.

*Primary Examiner* — Eric Keasel
*Assistant Examiner* — Reinaldo Sanchez-Medina
(74) *Attorney, Agent, or Firm* — Venable LLP; Eric J. Franklin (57) ABSTRACT A gate valve actuator including a stem that is movable linearly in an actuator housing connectable to the gate valve. The stem acts on the gate valve to shift the gate valve between open and closed positions, respectively. The stem is driven by a motor in a first direction into a steady state operation position. In the position the stem is biased in a second opposite direction towards a shutdown position by a spring member acting on the stem. A trigger mechanism is arranged for holding the spring member in a compressed state. The trigger mechanism includes an electrically controllable trigger that is arranged for release of the spring member in result of de-energizing the electrically controlled trigger. A method for shifting a gate valve between a steady state operation mode and a shutdown mode utilizing the gate valve actuator.

22 Claims, 9 Drawing Sheets

U.S. PATENT DOCUMENTS

| | | | |
|---|---|---|---|
| 4,872,638 A * | 10/1989 | Thompson et al. | 251/54 |
| 6,129,333 A * | 10/2000 | Ma | 251/68 |
| 6,293,514 B1 * | 9/2001 | Pechoux et al. | 251/122 |
| 6,572,076 B1 | 6/2003 | Appleford et al. | |
| 6,619,388 B2 | 9/2003 | Dietz et al. | |
| 6,676,105 B2 * | 1/2004 | Dayton et al. | 251/54 |
| 7,172,169 B2 | 2/2007 | Biester | |
| 2005/0001185 A1 * | 1/2005 | Everingham et al. | 251/69 |
| 2006/0048602 A1 | 3/2006 | Biester | |

* cited by examiner

GATE VALVE ACTUATOR AND METHOD

CROSS-REFERENCE TO RELATED APPLICATIONS

This application claims priority to Norwegian patent application 20080909 filed 21 Feb. 2008 and is the national phase under 35 U.S.C. §371 of PCT/IB2009/000285 filed 18 Feb. 2009.

TECHNICAL FIELD OF THE INVENTION

This invention relates generally to an actuator useful in sub sea production of hydrocarbons, and relates especially to the controlled release of stored energy for the purpose of driving a gate valve from a process wise unsafe position to a process wise safe position. Specifically, the present invention relates to a gate valve actuator and to a method for shifting a gate valve from a steady state operation mode into a shutdown mode, such as an emergency shutdown mode.

BACKGROUND AND PRIOR ART

In the following background discussion, as well as in the disclosure of the present invention, the following abbreviations will be frequently used:

| | |
|---|---|
| BL | brush-less |
| DC | direct current |
| ESD | emergency shutdown |
| LVDT | linear variable differential transformer |
| PM | permanent magnet |
| PSD | production shutdown |
| SIL | instrumented safety level |
| SMA | shape memory alloy |
| VSD | variable speed drive |
| XMT, Xmas tree | Christmas tree |

The prior art gate valve actuators for hydrocarbon production comprises both hydraulic and electrical control. In the context of the present invention the electrical actuators are the most relevant among the prior art devices.

The concept of using a rotary electrical motor as prime driver and converting this rotary motion to linear motion for operation of a slab gate valve is common. In contemporary designs there is a tendency to select BL DC PM motors as motor technology for high torque performance, and a planetary roller screw for mechanical rotary-to-linear conversion, although other motor types and other rotary-to-linear conversion systems are also commonplace.

A critical feature of slab gate valves and actuators used for control of flow of hydrocarbons through a sub sea Christmas tree is the mechanism provided for emergency operation to the safe position. Upon a failure of the power supply the valve must still revert from the production position (less safe position) to the safe position (no production position).

U.S. Pat. No. 7,172,169 (Biester) and U.S. Pat. No. 6,572,076 (Appleford) are considered representative for contemporary designs and a good example of current efforts in this area both in terms of actuator design and trigger mechanisms for emergency operation.

The present invention relates to a so called fail safe actuator, i.e. an actuator which drives the valve it controls to the (process-wise) safer position out of two possible positions, on loss of power, or in response to a certain class of ESD. For instance, as applied to the Master or Wing Valve of a Xmas tree, the valve will go to the closed position on loss of control as part of a strategy to secure well safety barriers.

The task is thus to achieve an actuator which is very reliable in regular operation and which turns to a safe position on loss of active control. Historically the most widely accepted energy source to be activated on loss of control for safe closure of the critical XMT valves and other valves of similar functionality is in the release of a mechanical spring, which is kept pre-tensioned in the less safe valve position to provide the power source needed to move the slab gate against the forces of friction and other forces resisting the motion (closure or open as the case may be; some types of valves are to be opened during an emergency shutdown). For hydraulic actuators the fail safe mechanism is usually embedded in the electro-hydraulic control system in the form of a continuously energised solenoid valve. For the case of electrically operated actuators the spring is in most cases released by means of an electromagnetic device. In later years there are also examples of actuators reverting to the safe position in the ESD mode under a power supply from an electrical battery or other device for storage of electrical energy. Such designs usually depend on an electronic Variable Speed Drive (VSD) driving the motor for ESD operation, thus placing very high reliability requirements on these circuits.

For the purpose of the present invention it has been assumed that a mechanical spring is the most reliable energy source available.

One object of the present invention is to provide a highly reliable trigger mechanism for release of a spring action, thus maximising the reliability of the ESD process and thus securing a high SIL class.

There are many schemes devised to achieve a reliable trigger mechanism. This invention is based on a combination of an electrically controlled trigger with a leverage mechanism to trigger a spring action to close e.g. a Master Valve instantly if communication or power supply were to fail. The trigger mechanism is devised to handle the full force of the spring, thus avoiding involvement of any intermediate drive train components in the ESD process.

In many prior art actuators based on use of a mechanical spring to provide the emergency power the spring is moved with the gate motion at all times. This normally means that the valve is only actively driven to the least safe position (typically steady state production mode) and is always returned to the safe position under spring action. This approach only involves a motor and drive circuitry designed for single quadrant operation (active drive in one direction only, no generator operation). Other designs are based on pre-tensioning the mechanical spring only once and active drive of the valve back and forth. Obviously this is a two quadrant operation. The increase in complexity in the electrical/electronic circuitry to achieve the two quadrant operation is relatively insignificant. Also the inherent advantage of saving power by separating the motions of a roller screw and a spring is considered marginal and incidental. Reliability of the ESD function in combination with reliability of the regular operation represents the essence of any actuator design for the subject implementation.

The challenge in neutralising the spring force by resting it on a trigger mechanism lies in achieving a high reliability fail safe mechanism operating at low power consumption, for a spring of sufficient force. For some actuators required by the oil industry the required force may be as high as 40 tonnes, a typical order of magnitude for a 5" slab gate valve, or even significantly higher for the case of 7" valves.

It may be observed for instance in prior art U.S. Pat. No. 6,572,076 that the device for triggering the ESD requires the trigger power to act against the force of the main fail safe spring, thus quite substantial forces and power levels would be involved in countering the inherent force of the return spring in the steady state condition.

One object of the subject invention is to provide a gate valve actuator by which the power required for operation in the steady state condition being small and substantially less than the force exerted by the main return spring under compression, thus only counteracting a local and auxiliary spring force.

Another feature of referred prior art is the potential for galling effects as the gate operating stem is retracted upon shifting from steady state operation mode to shutdown mode.

It is another object of the subject invention to provide a gate valve actuator which is capable of releasing very high forces without galling effects.

SUMMARY OF THE INVENTION

The objects are achieved, and the drawbacks of prior art essentially eliminated, by a gate valve actuator and a method.

Briefly, the present invention provides a gate valve actuator comprising a stem which is movable linearly in an actuator housing that is connectable to the gate valve, the stem acting on the gate valve to shift the gate valve between open and closed positions, respectively, wherein the stem is driven by a motor in a first direction into a steady state operation position, and in said position the stem is biased in a second opposite direction towards a shutdown position by means of a spring member acting on the stem. The actuator is characterized by a trigger mechanism arranged for holding the spring member in a compressed state in a holding position, said trigger mechanism comprising an electrically controllable trigger which is arranged for release of the spring member in result of de-energizing the electrically controlled trigger.

In this way an actuator is achieved which is very reliable in regular operation and which turns to a safe position on loss of active control.

The trigger mechanism can be structurally realized in different ways. An advantageous embodiment of the trigger mechanism comprises at least one latch which is pivotally supported in the actuator housing about a pivot, such that in the compressed state of the spring member, a first end of the latch is in operative engagement with the stem and an opposite second end of the latch is in operative engagement with the trigger.

In this way the mechanism can be designed to provide a leverage function which substantially reduces the power of the spring member, and thus reduces contact pressures between components included in the trigger mechanism.

In a preferred embodiment, the trigger comprises a rod which is movable linearly in the actuator housing, and an electrically driven trigger actuator driving the rod into the holding position wherein the rod engages the latch, and which upon de-energizing the trigger actuator, the rod is withdrawn from the holding position by means of a biasing trigger actuating spring.

In this way the power that is required to maintain the mechanism in a steady state operation mode is reduced and only counteracting a local and auxiliary spring force that is not related to the force of the main return spring.

Preferably, the latch is arranged to engage the rod indirectly via a locking pin which in the holding position is arrested by the rod to engage a seat formed in the second end of the latch, and which upon withdrawal of the rod is pushed by the pivoting latch out from the seat, allowing this way the latch to pivot out of engagement with the stem.

The locking pins may be of cylindrical section providing a rolling action and minimum friction upon release, and in addition to the low mechanical contact pressure in result of the leverage mechanism this way further ensuring, that release of the return spring can take place without any galling effects.

Upon withdrawal of the rod, the locking pin may be pushed by the pivoting latch into a recess formed on the rod.

In the shutdown mode, a latch return spring is preferably arranged for biasing the latch towards the holding position.

The trigger actuator may be realized in the form of a solenoid or alternatively in the form of a shape memory alloy (SMA) element.

The trigger mechanism preferably comprises a latch which is shaped as a lever and designed to substantially reduce, by virtue of location of its pivot, the force that is transmitted from the spring member to the trigger mechanism in steady state operation mode.

The stem may be arranged to comprise or connect to an annular piston that is received for movement in an annular cylinder comprised in the actuator housing, whereby the annular cylinder contains a hydraulic medium for dampening the movement of the stem upon release of the spring member. Said hydraulic medium in the annular cylinder is then in flow communication with the actuator housing interior via at least one flow restrictor opening. Check valves and particle filters may be arranged in the flow path/paths of the hydraulic medium.

The gate valve actuator briefly discussed above operates in a method for shifting a gate valve between a steady state operation mode and a shutdown mode. The method comprises the steps of:
  driving the actuator by a motor in a first direction for shifting the gate valve into the steady state operation mode;
  arranging a compressible force means to exert, in the steady state operation mode, a bias on the actuator in a second direction opposite the first direction, and
  driving the actuator in the second direction by release of the compressed force means in the shutdown mode.

Further subordinated method steps include:
  arranging in the gate valve actuator an electrically controlled trigger mechanism;
  energizing the trigger mechanism for holding the force means in the compressed state;
  energizing the trigger mechanism by a solenoid, or by a shape memory alloy element.

The structure of the gate valve actuator provides for testing of the emergency shutdown (ESD) functionality through the steps of:
  driving the gate valve actuator further in the first direction during steady state operation mode by operation of the motor, against the force of the compressed force means, and
  returning the actuator to the steady state operation mode by the force of the compressed force means.

Further features and advantages provided by the invention will be further appreciated from the following detailed description of embodiments of the invention.

SHORT DESCRIPTION OF THE DRAWINGS

The invention will be more fully explained below with references to the drawings, schematically illustrating embodiments of the invention. In the drawings.

DETAILED DESCRIPTION OF EMBODIMENTS OF THE INVENTION

Figure 1:
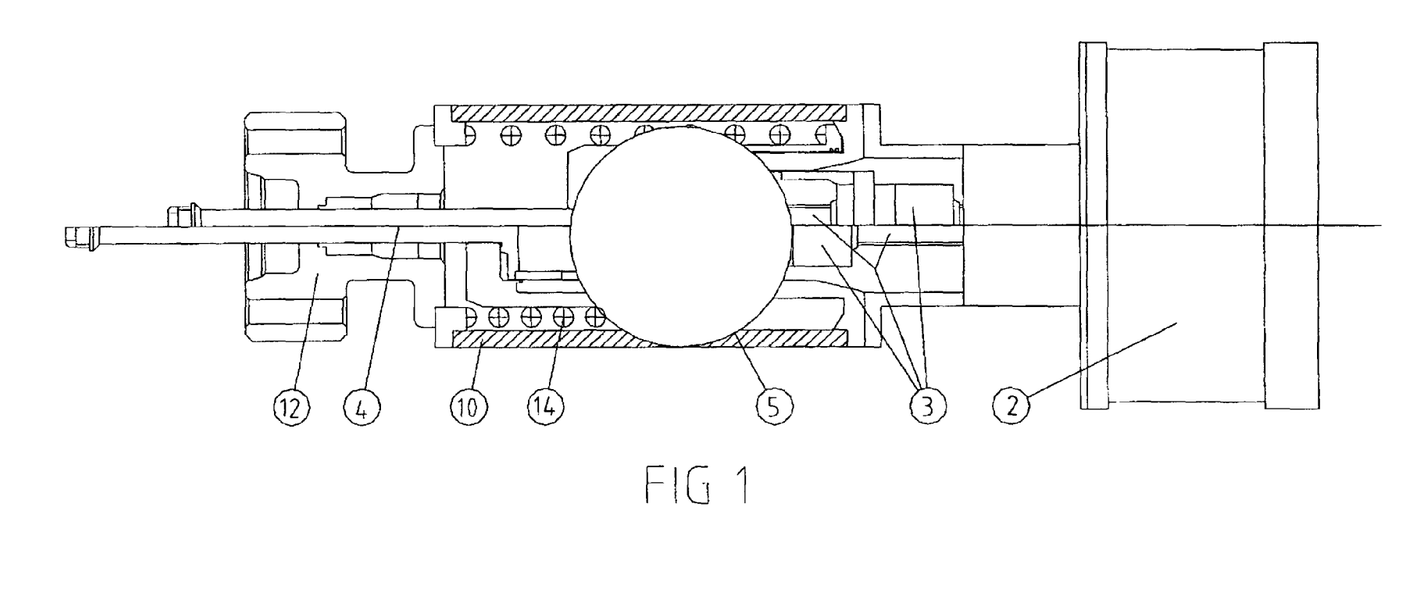
FIG. 1 shows in section a gate valve actuator driven by an electrical motor and equipped with a fail safe mechanism for arrest and release of a return spring.
Figure 2:
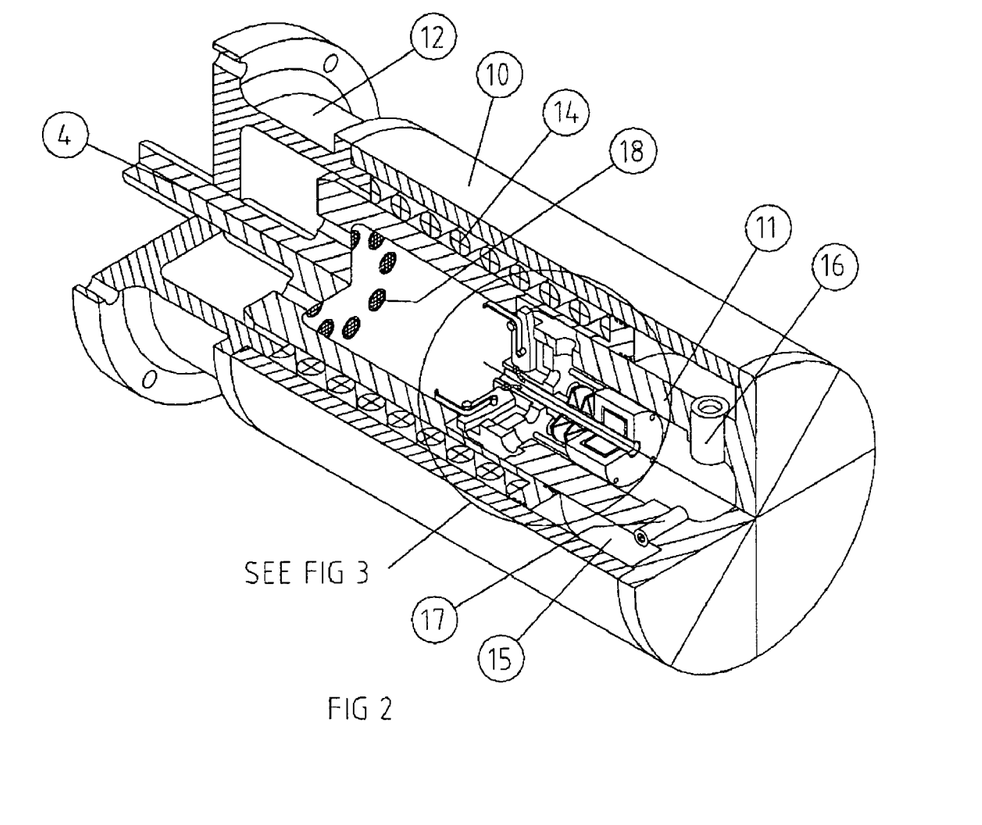
FIG. 2 is a partially sectioned perspective view showing the relevant parts of the gate valve actuator of FIG. 1 on a larger scale and in a steady state operation mode, the embodiment of FIG. 2 being based on a solenoid for actuation of a trigger mechanism.
Figure 3:
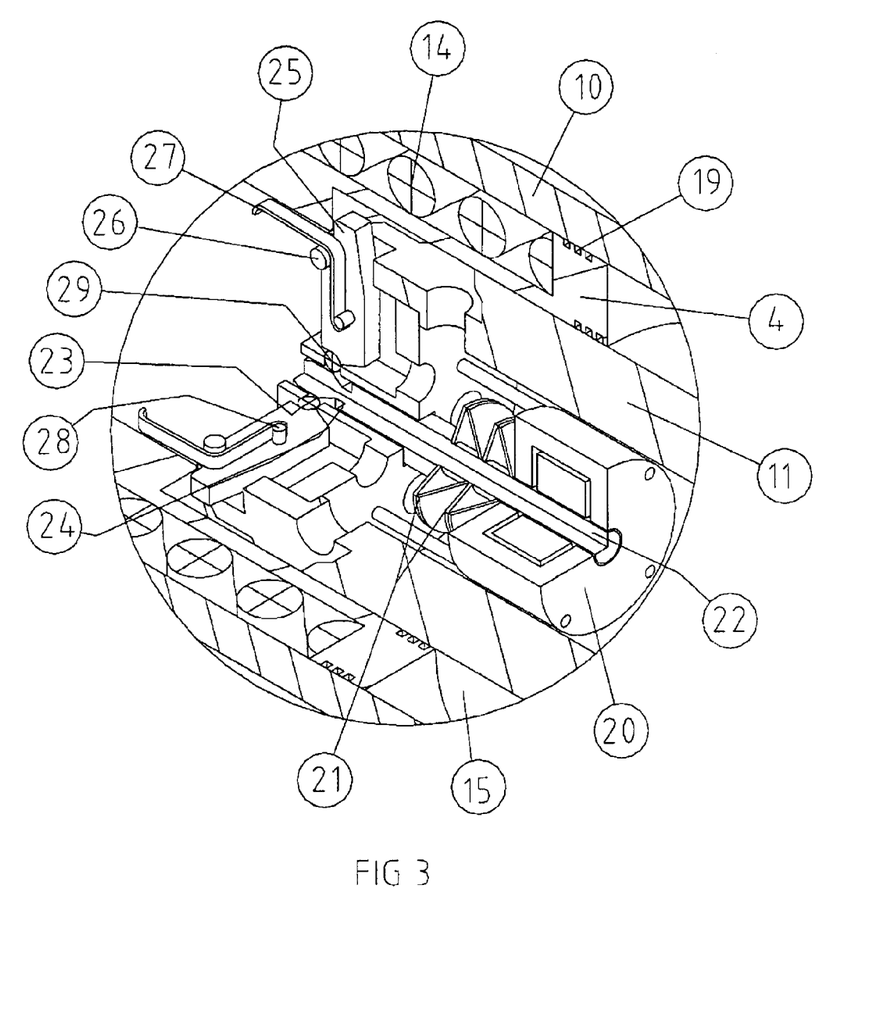
FIG. 3 is a detailed view showing the trigger mechanism of FIG. 2 on a yet larger scale.
Figure 4:
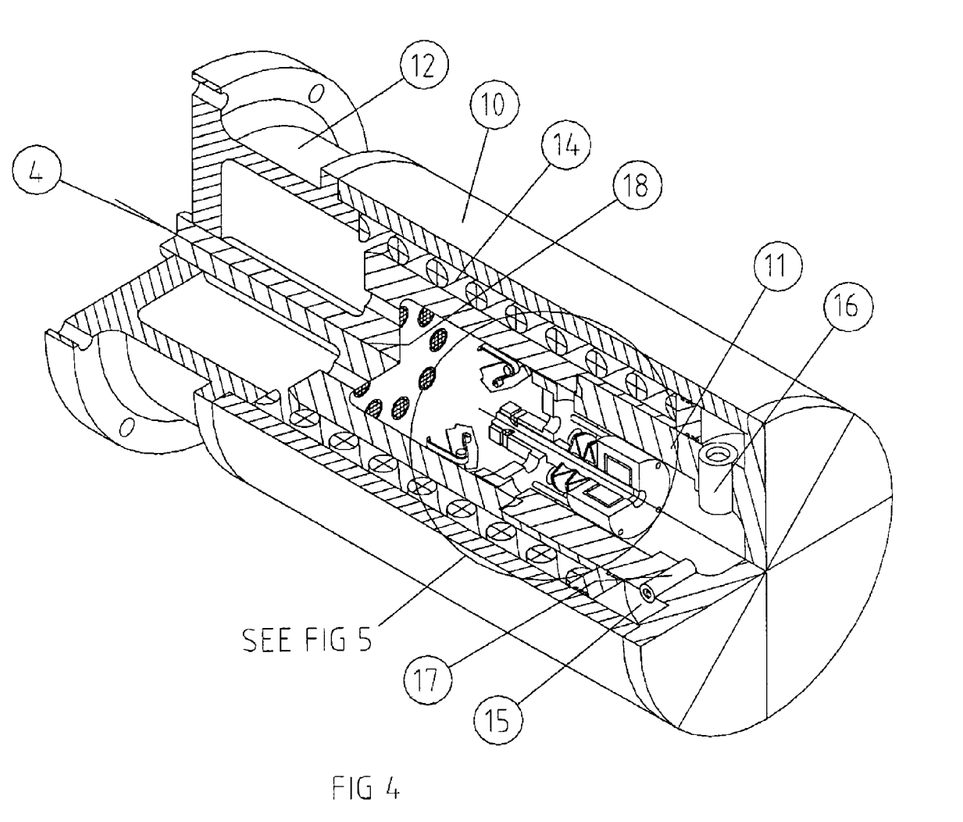
FIG. 4 is a view corresponding to FIG. 2, showing the gate valve actuator in a shutdown mode.
Figure 5:
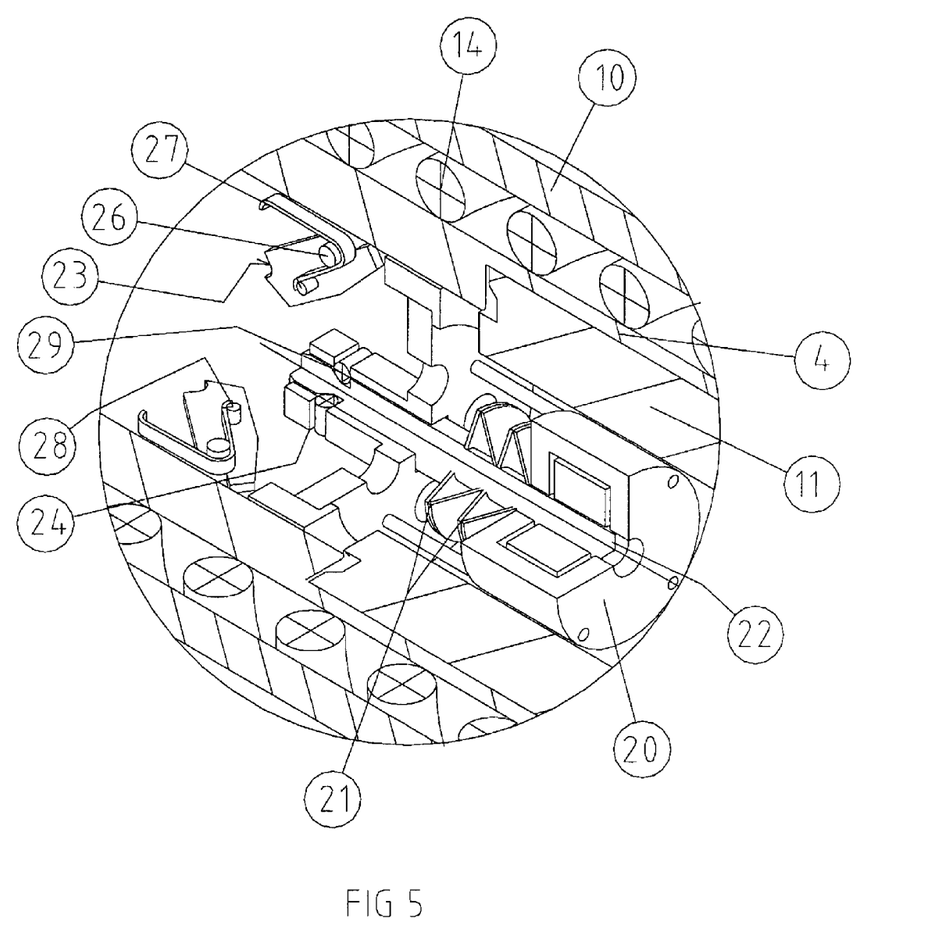
FIG. 5 is a view corresponding to FIG. 3, showing the gate valve actuator in the shutdown mode.
Figure 6:
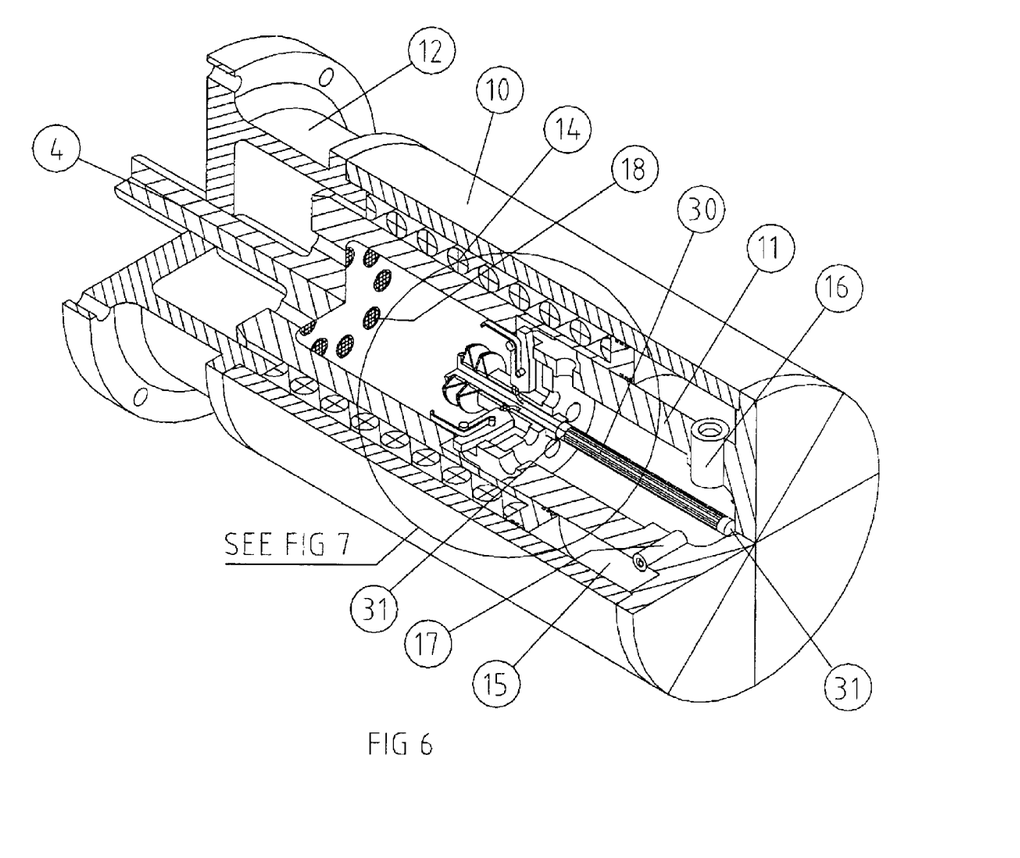
FIG. 6 is a view corresponding to FIG. 2, showing a second embodiment of the gate valve actuator in the steady state operation mode, the embodiment of FIG. 6 being based on an SMA element for actuation of the trigger mechanism.
Figure 7:
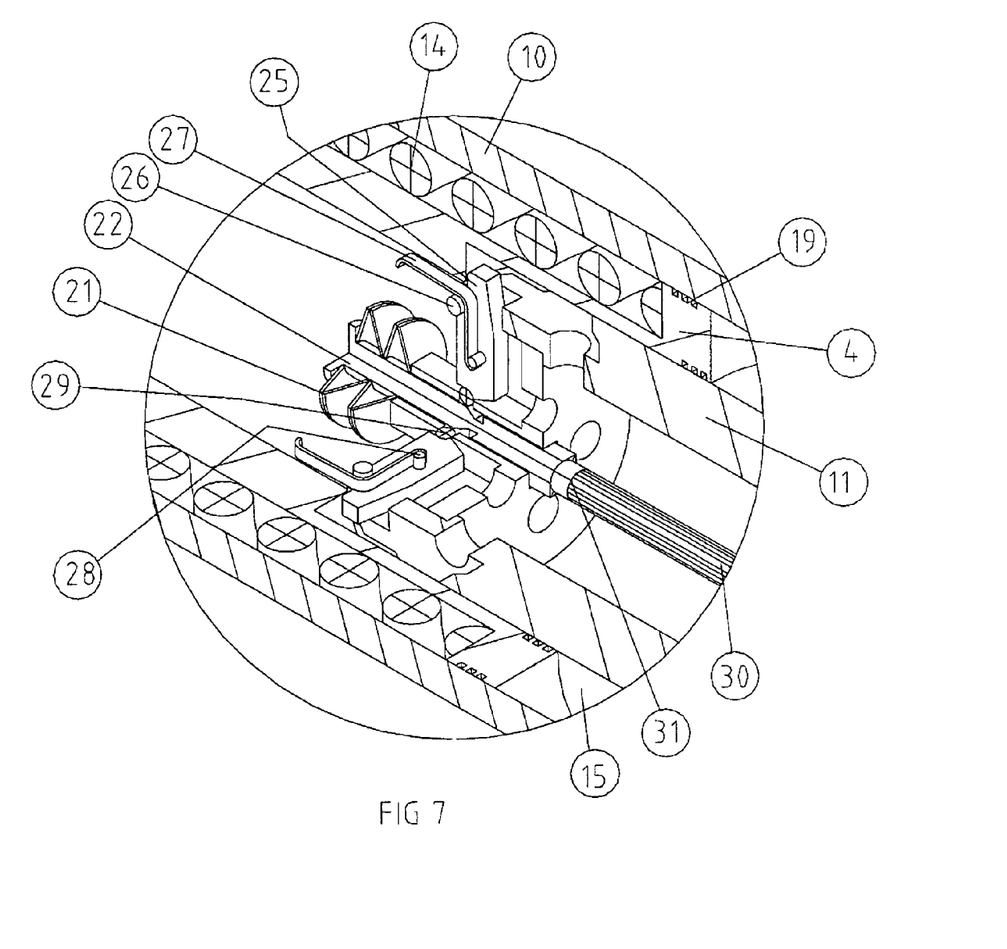
FIG. 7 is a view corresponding to FIG. 3, showing the embodiment of FIG. 6 on a larger scale.
Figure 8:
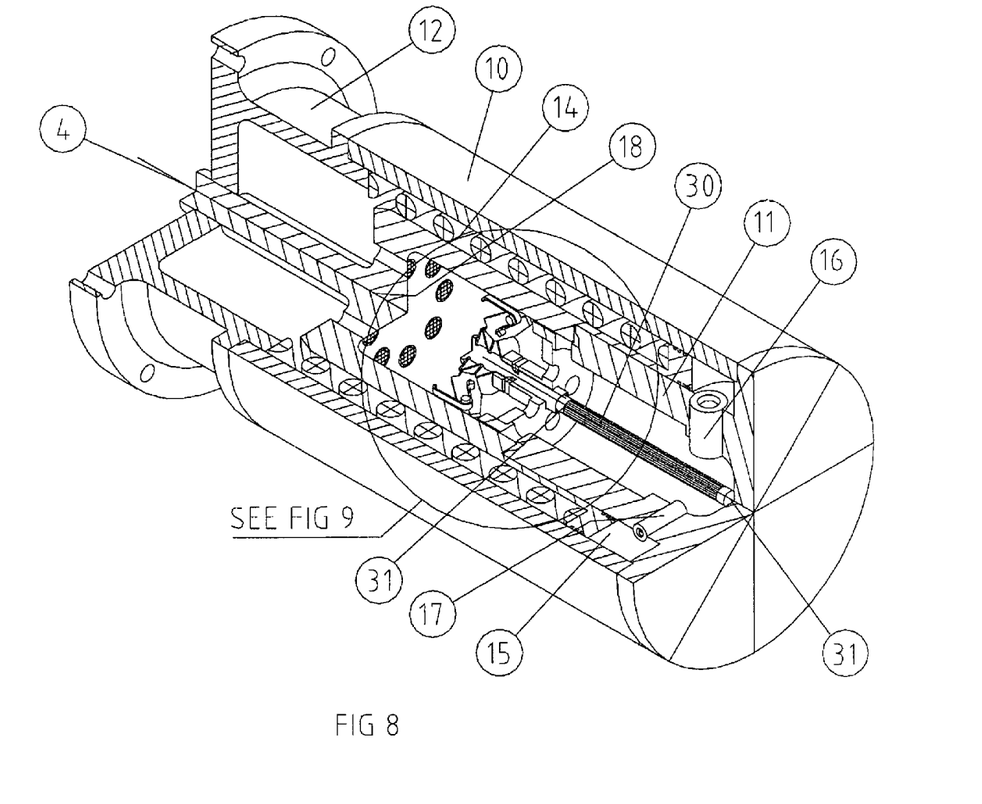
FIG. 8 is a view corresponding to FIG. 4, showing the embodiment of FIG. 6 in shutdown mode.
Figure 9:
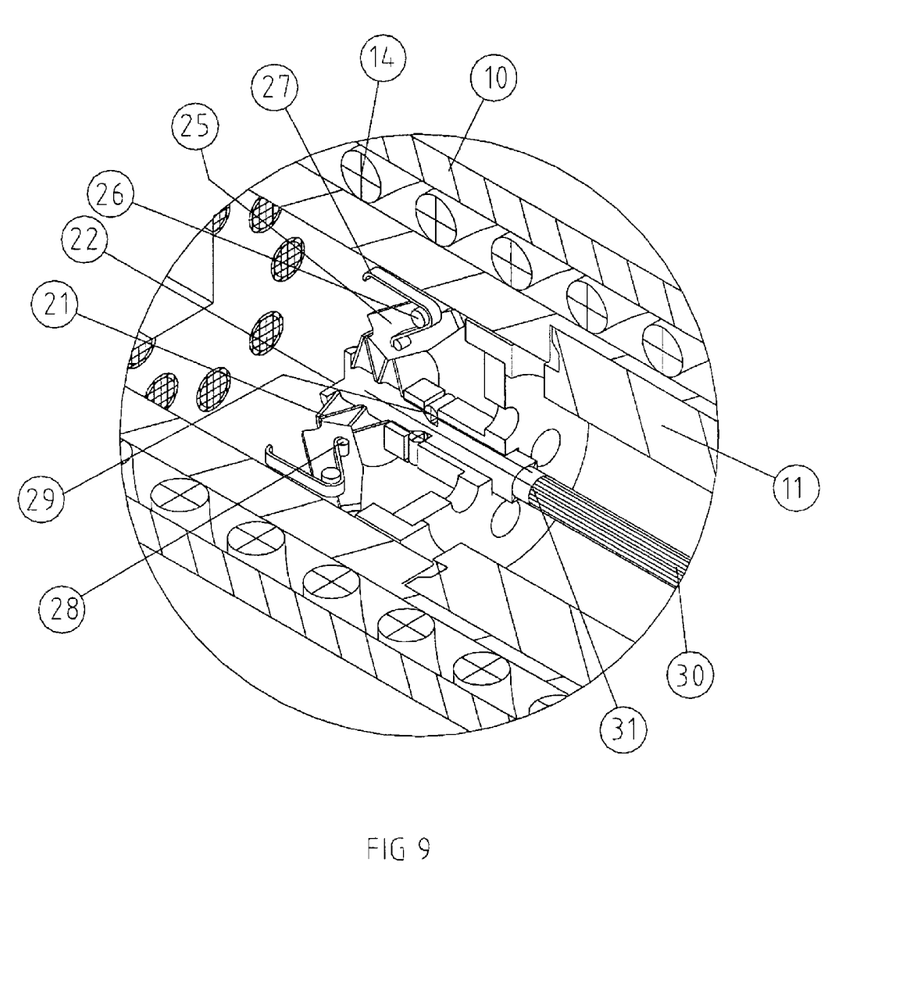
FIG. 9 is a view corresponding to FIG. 5 showing the embodiment of FIG. 6 in shutdown mode.

The general layout of a typical electric actuator for sub sea production control is illustrated in FIG. 1. The combination of a roller screw arrangement 3 and a PM motor drive 2 is considered commonplace and not part of the present invention. Likewise the bonnet 12 interfaces to a tree or other tubing is a common feature of most such actuators. The focal point of the invention is the fail safe mechanism, illustrated as a group 5 of components in FIG. 1.

It should be noted that only FIG. 1 illustrates a complete actuator, all other figures show only the components comprised in the fail safe mechanism. The essence of the present invention is the interaction between a return force means, a motor drive train and a trigger mechanism, the intent being to create an actuator of the highest operational reliability, both in terms of the capability to shutdown a production system on command and also to start and maintain the production system operational.

The basic operating principle is to use the motor 2 and roller screw 3 as a jack to run a stem 4 to operate a gate valve 1 into the production (steady state) condition, apply the failsafe mechanism to hold the stem 4 in this position, wherein forces applied from a return spring 14 (or other equivalent force means) being neutralised by a trigger mechanism, then immediately returning the roller screw assembly to the valve safe position while the valve remains in the production position. Thus there is no fixed mechanical connection between the motor-and-roller screw jack assembly and the stem of the gate valve actuator. The roller screw pushes the stem for operating the valve into the steady state operation mode, but can not be used to return it to the safe position in shutdown mode.

When the stem and gate are brought to the production position and secured in that position by action of the fail safe mechanism, the roller screw arrangement is immediately driven by activating the motor 2 in the reverse direction back to the closed valve position, thus getting out of the way of a possible ESD action. Although the valve would revert to the safe condition even with the roller screw in the extended position, the probability of achieving a successful ESD is enhanced by the extended roller screw only being in that position for some 1-2 minutes per actuation. With ESD of the class which requires uncontrolled and un-powered shut-in (in the normal sense of the words) being extremely rare, the SIL class achieved will rely nearly exclusively on the reliability of the fail safe trigger mechanism disclosed below.

The roller screw has free back-drive characteristics, i.e. in the event of an ESD being activated when the roller screw assembly is still in the production position it will not prevent ESD, but the roller screw will be driven, additionally to the motor action, under the action of the return spring to the safe position. Thus there are (in terms of roller screw action) two, i.e. redundant, options for achievement of ESD, both of very high reliability. This is the essence of sub sea design strategies, to provide redundancy in functionality wherever necessary and with both mutually redundant functions of high reliability.

SIL is a statistical concept in nature and logarithmic in scale. It is an expression of the statistical probability of success of performing an ESD on command at any time irrespective of operational mode. Thus two redundant schemes, each of high reliability, are bound to have a favourable influence on the SIL rating.

It should be noted in this context that normally, by procedures practiced by most operators, only one valve is activated at the time on any tree, thus even for the short duration of the jack system being in the ESD path, the tree, as a safety barrier, is intact at all times.

The move from production position to the safe position falls into two distinct classes:

1 ESD (several classes)
2 Production shut in

An ESD situation of a more serious class (known in some oil provinces as ESD 0 and ESD 1) may simply cut the power supply, or the power supply may be cut accidentally by the control umbilical being severed by external causes. In this situation the primary trigger or trigger actuator (solenoid 20 or SMA device 30) will release an auxiliary trigger spring 21, and latches or latching dogs 25 will go to the de-latch position, thus releasing the return spring 14 and the valve will return to the safe position.

In the less serious ESD modes (know in some provinces as variations of ESD class 2, exemplified by a gas leakage alarm on the host platform) and in the PSD mode the control system will be used actively (if shutdown were to be required) to turn the process installation to the safe mode. In this situation the roller screw is extended to take the force of the return spring off the trigger mechanism before the trigger is activated, thus the trigger is for this more common and frequent situations released with no forces on the fail safe trigger mechanism except the small auxiliary spring(s) of the trigger itself in play. These situations will not cause any wear of significance on the trigger at all, forces typically being reduced from the 40 tonnes of the return spring 14 to typically a few hundred Newtons of the auxiliary spring 21 (numbers being referred to a 5" actuator, e.g.).

Referring to FIGS. 1 through 9 the roller screw 3 is driven by the motor 2 by means of a VSD unit (not shown) to run the valve stem 4 to the production position. When the position detection system (usually an LVDT, not shown) detects that the desired position is achieved the solenoid 20 or the SMA element 30 pulls against the auxiliary trigger spring 21 to engage the latching dogs 25 by means of locking pins 29 engaging seats 23 formed in the subject ends of the latch dogs 25. The locking pins 29 then prevent the latch dogs from motion as long as the primary trigger/trigger actuator SMA 30 or solenoid 20, connected to and/or acting on a rod-shaped trigger 22, are energised. Once the primary trigger/trigger actuator 20 or 30 is de-energised as part of an ESD process, the locking pins 29 are moved out of the blocking position in seats 23, into recesses 24 formed on the trigger rod 22, and the return spring 14 is free to push the stem 4 back to the safer position. The latch dogs 25 provide, by virtue of the displaced location of their pivots 26, a leverage mechanism reducing the high contact pressure between the return spring 14 and the latch dogs to a much lower contact pressure between the latch dogs 25 and the locking pins 29. The latch dogs 25 and the associated locking pins 29 should preferably be arranged evenly distributed around the center line of the actuator. Preferably three or more latch dogs 25/locking pins 29 should be used.

In case of locking pins 29 of cylindrical section as in the illustrated embodiments, the rolling action of the locking pins 29 at release, in addition to the low mechanical contact pressure achieved by leverage action from the latches 25, it is ensured that release can take place at low frictional resistance and without any galling effects.

The latch dog return springs 27 are provided to return the latches to the engage position awaiting the next push of the jack system.

On completing the stroke from the safer position to production position the roller screw and motor provide all the energy required to pretension the return spring 14, thus the solenoid 20 or the SMA device 30 is not required to hold the return spring 14 in a compressed state, the trigger actuators 20 and 30 are only required to hold the trigger spring 21 in compression. This reduces the power needed, and thus the electrical power consumption in steady state production mode is correspondingly reduced.

In order to prevent the return-to-safe-position stroke from excessive speeds an annular damping cylinder 15, check valve(s) 16 and flow restrictor(s) 17 as well as seals 19 are provided. Filters 18 may serve to catch particulate contamination in the oil volume and may advantageously be combined with simple check valves (not shown) to make sure the debris is not released from the filters.

An SMA or a solenoid controlled trigger mechanism both have a characteristic desirable in a sub sea ESD application, i.e. the sluggish response. This characteristic, which is often a disadvantage in many industrial applications, renders these devices insensitive to glitches in power and communication systems without the benefit of dedicated timers included in the design. The delayed action is to the contrary inherent in the operating principle, more so for an SMA device than for a solenoid type device. The latter can only be sensibly designed for a delay of around 1 second (order of magnitude) as applied to a sub sea actuator as described in this disclosure. This will for most designs be sufficient. A larger delay can be achieved by adding a capacitor across the solenoid winding whenever the natural and inherent delay in a response is considered inadequate.

The present invention assumes use of a BL DC PM motor of high torque (wide selection available), or other electrical motor, driving a planetary roller screw (typically of such design as is commonly found on the market and in catalogue material) of low pitch to achieve maximum linear force per unit torque offered by the BL DC PM machine. Neither of these elements form part of the invention as they appear in a multitude of actuator designs and are thus well established in the public domain. Other forms of rotary to linear conversions could also be used. In the following only a roller screw is described, but it should be understood that any rotary to linear conversion unit could be employed.

Although such a roller screw may be designed with a certain pitch to provide free back-drive (the pre-tensioned return spring driving the roller screw into the reverse direction), the present invention is based on designing the roller screw for minimum practicable pitch such as to utilize the motor torque to the maximum extent. The roller screw will still have free back drive. However, the combination of a high gear ratio and prolonged roller screw exposure to a very high force may raise issues around the long term reliability of the back drive. It should be noted that back drive credibility is not a binary issue: The higher the gear ratio of the mechanical drive train, the lower the efficiency of the mechanical train, the higher the exposure to the force of the return spring, the more issues are raised relating to the reliability of the free back drive capability.

The trigger mechanism comprises an electromagnetic or an SMA part trigger actuator and a leverage mechanism. The latter is the same in principle for both embodiments; the trigger actuator representing the difference between the two disclosed embodiments. The purpose of the leverage mechanism is to reduce the mechanical force to be handled by the trigger by means of a leverage mechanism, from typically 40 tonnes for a 5 inch actuator to a much smaller value, and also to provide a release mechanism which does not lend itself to galling, i.e. controlled exposure to pressure between two mechanical parts in motion.

In one embodiment the thermo-electrical trigger actuator consists of an SMA based actuation operation. It comprises typically an SMA type wire/rod (typically NiTi alloys) conducting an electrical current in the steady state production mode to retain the wire at a certain temperature higher than the environment (oil). In the ESD mode the power supply is cut off, the SMA wire is cooled down by the ambient oil, the SMA device returns to its alternative shape and the return spring is released to drive the valve to the safe position. On start-up from cold conditions the trigger actuator is set to retain the valve in the less safe position once this position is reached.

The nature of SMA materials is in the public domain and known to be elements of actuator design, no attempt to describe their nature is offered as part of this disclosure except to state the purpose of their application, the phase change of such materials as e.g. Ni Ti in response to temperature changes, effectively changing their e-module in a dramatic way, thus facilitating provision of "actuators without moving parts". Such actuators may be designed for large forces and typically offer 2-3 percent elongation for long life times, i.e. a 1 meter rod will extend/contract 3 centimeters in response to a temperature change under suitable operating conditions. The basics of SMA designs have been known for more than 20 years and their uses are considered to be in the public domain.

Thus the suggested SMA circuits have been shown in a simplified version, omitting electrical insulation, wires for power supply, transformer, switching devices and other features required to provide an operable design. To those conversed in the art, design of SMA devices for industrial purposes represent a known territory, requiring skills that are relatively rare, but in the public domain.

In a second preferred embodiment the primary trigger is a conventional electro-mechanical solenoid as currently found in a multitude of industrial applications. In addition to the provision of an actuator with high reliability in achieving both ESD on command and production on command, the suggested actuator also facilitates a method of testing ESD functionality without shutting in production. In principle it is desirable that all ESD functionality is tested on a regular basis. It has never been considered prudent, however, to shutdown a high productivity, sub sea production or injection well for the purpose of barrier testing more frequently than once a month.

The suggested actuator concepts facilitate testing of the ESD capability without sacrifice of production and without significant wear on the equipment. When an ESD test is considered desirable the motor and roller screw is used to extend the jack and stem to the open valve position, sufficient to take the loading off the fail safe mechanism. The return spring 14 is then allowed to drive the roller screw back a minor distance, corresponding to a minor percentage of the stroke, but sufficient to detect back motion either by means of the LVDT or by measurement of the generator effect in the motor, now running as a synchronous generator. Once motion of the stem is detected, full torque is applied on the motor to drive the gate valve back to the ultimate production position. The entire motion back and forth may be a small as 1-2 mm and could be covered, if appropriate, by an overlap in the gate valve design, such that the flow cross sectional area is not influenced at all during testing.

The present invention is of course not in any way restricted to the embodiments described above. On the contrary, many possibilities to modifications thereof will be apparent to a person with ordinary skill in the art without departing from the basic idea of the invention such as defined in the appended claims.

LIST OF REFERENCES 1 (not used)
2 is the drive motor, typically a Permanent Magnet or squirrel cage unit
3 is the rotary-to-linear conversion unit (typically a planetary roller screw
4 is the stem of the actuator connecting the actuator to the gate valve in one end and in the opposite end comprises or is connected to a piston with dampening function
5 shows the location of the fail safe mechanism
6-9 (not used)
10 is the housing of the actuator
11 is the aft bonnet with trigger mechanism interface
12 is the forward bonnet for connection to the tree or other type of piping
13 (not used)
14 is the return spring providing the energy for the fail safe action
15 is the annular damping cylinder
16 inlet check valve(s)
17 are flow restrictor(s)
18 are particle filters
19 are damping cylinder seals
20 is an electro magnet (solenoid)
21 is the trigger actuating spring (auxiliary spring)
22 is the latch activation rod
23 is a seat formed in a second end of the latch
24 is a recess formed on the rod included in the trigger mechanism
25 are latches/latch dogs
26 are latch dog pivot points
27 are latch dog return springs
28 are retainers for the latch dog return spring
29 are locking pins
30 is the SMA element (or elements)
31 are electrical connection points and insulators

The invention claimed is:

1. A gate valve actuator, comprising:
a stem which is movable linearly in an actuator housing connectable to the gate valve, the stem acting on the gate valve to shift the gate valve between open and closed positions, respectively, wherein the stem is driven by a motor in a first direction into a steady state operation position, and in said position the stem is biased in a second opposite direction towards a shutdown position by a spring member acting on the stem, and
a trigger mechanism arranged for holding the spring member in a compressed state in a holding position, the trigger mechanism comprising an electrically controllable trigger which is arranged for release of the spring member in result of de-energizing the electrically controlled trigger, wherein the trigger mechanism comprises at least one latch which is pivotally supported in the actuator housing about a pivot, a first end of the latch being in operative engagement with the stem while the opposite second end of the latch is in operative engagement with the trigger, in the compressed state of the spring member,
wherein the trigger mechanism comprises a rod which is movable linearly in the actuator housing, an electrically driven trigger actuator driving the rod into the holding position wherein the rod engages the latch, and a trigger spring by which the rod is withdrawn from the holding position to a withdrawn position upon de-energizing the trigger actuator, and
wherein the latch engages the rod indirectly via a locking pin which in the holding position is arrested by the rod to engage a seat formed in the second end of the latch, and which upon withdrawal of the rod is pushed by the latch out from the seat, thereby permitting the latch to pivot out of engagement with the stem.

2. The actuator according to claim 1, wherein upon withdrawal of the rod, the locking pin is pushed by the latch into a recess formed on the rod.

3. The actuator according to claim 1, wherein the latch in the released position is biased by a latch return spring towards the holding position.

4. The actuator according to claim 1, wherein the trigger actuator is a solenoid.

5. The actuator according to claim 1, wherein the trigger actuator is a shape memory alloy element.

6. The actuator according to claim 1, wherein the trigger mechanism comprises a latch shaped as a lever which, by virtue of location of the pivot, is designed to substantially reduce the force transmitted from the spring member to the trigger mechanism.

7. The actuator according to claim 1, wherein the stem comprises or is connected to an annular piston received in an annular cylinder comprised in the actuator housing, wherein the annular cylinder contains a hydraulic medium for dampening the movement of the stem upon release of the spring member.

8. The actuator according to claim 7, wherein the hydraulic medium in the annular cylinder is in flow communication with the actuator housing interior via at least one flow restrictor opening.

9. A gate valve actuator, comprising:
a stem which is movable linearly in an actuator housing connectable to the gate valve, the stem acting on the gate valve to shift the gate valve between open and closed positions, respectively, wherein the stem is driven by a motor in a first direction into a steady state operation position, and in said position the stem is biased in a second opposite direction towards a shutdown position by a spring member acting on the stem, and a trigger mechanism arranged for holding the spring member in a compressed state in a holding position, the trigger mechanism comprising an electrically controllable trigger which is arranged for release of the spring member in result of de-energizing the electrically controlled trigger, wherein the trigger mechanism comprises at least one latch which is pivotally supported in the actuator housing about a pivot, a first end of the latch being in operative engagement with the stem while the opposite second end of the latch is in operative engagement with the trigger, in the compressed state of the spring member, wherein the latch in the released position is biased by a latch return spring towards the holding position.

10. The actuator according to claim 9, wherein upon withdrawal of the rod, the locking pin is pushed by the latch into a recess formed on the rod.

11. The actuator according to claim 9, wherein the latch in the released position is biased by a latch return spring towards the holding position.

12. The actuator according to claim 9, wherein the trigger actuator is a solenoid.

13. The actuator according to claim 9, wherein the trigger actuator is a shape memory alloy element.

14. The actuator according to claim 9, wherein the trigger mechanism comprises a latch shaped as a lever which, by virtue of location of the pivot, is designed to substantially reduce the force transmitted from the spring member to the trigger mechanism.

15. The actuator according to claim 9, wherein the stem comprises or is connected to an annular piston received in an annular cylinder comprised in the actuator housing, wherein the annular cylinder contains a hydraulic medium for dampening the movement of the stem upon release of the spring member.

16. The actuator according to claim 15, wherein the hydraulic medium in the annular cylinder is in flow communication with the actuator housing interior via at least one flow restrictor opening.

17. A method for shifting a gate valve between a steady state operation mode and a shutdown mode utilizing a gate valve actuator comprising a stem which is movable linearly in an actuator housing connectable to the gate valve, wherein the stem acts on the gate valve to shift the gate valve between open and closed positions, respectively, the method comprising:

driving the stem with a motor in a first direction for shifting the gate valve into a steady state operating position;

biasing the stem in a second opposite direction towards a shutdown position by a spring member acting on the stem in the steady state operating position;

holding the spring member in a compressed state in a holding position with a trigger mechanism comprising an electrically controllable trigger that is configured to release the spring member with the electrically controlled trigger is de-energized, wherein the trigger mechanism comprises at least one latch that is pivotally supported in the actuator housing about a pivot, a first end of the latch operatively engaging the stem while the opposite second end of the latch is in operative engagement with the trigger, in the compressed state of the spring member, and wherein the trigger mechanism comprises a rod which is movable linearly in the actuator housing;

driving the rod into a holding position with an electrically driven trigger actuator, wherein in the holding position the rod engages the latch;

withdrawing the rod with a trigger spring from the holding position to a withdrawn position upon de-energizing the trigger actuator;

driving the stem in the second direction opposite the first direction by release of the spring through de-energizing the electrically controllable trigger, in a shutdown mode; and engaging the rod with the latch indirectly via a locking pin, which in the holding position is arrested by the rod to engage a seat formed in the second end of the latch, and which upon withdrawal of the stem is pushed by the latch out from the seat, allowing the latch to pivot out of engagement with the stem.

18. The method according to claim 17, further comprising: energizing the trigger mechanism utilizing a solenoid, or a shape memory alloy element.

19. The method according to claim 17, further comprising: testing the emergency shutdown functionality through:

driving the gate valve actuator further in the first direction during steady state operation mode by operation of the motor, against the force of the compressed force element, and returning the actuator in the steady state operation mode by the force of the compressed force element.

20. A method for shifting a gate valve between a steady state operation mode and a shutdown mode utilizing a gate valve actuator comprising a stem which is movable linearly in an actuator housing connectable to the gate valve, wherein the stem acts on the gate valve to shift the gate valve between open and closed positions, respectively, the method comprising:

driving the stem with a motor in a first direction for shifting the gate valve into a steady state operating position;

biasing the stem in a second opposite direction towards a shutdown position by a spring member acting on the stem in the steady state operating position;

holding the spring member in a compressed state in a holding position with a trigger mechanism comprising an electrically controllable trigger that is configured to release the spring member with the electrically controlled trigger is de-energized, wherein the trigger mechanism comprises at least one latch that is pivotally supported in the actuator housing about a pivot, a first end of the latch operatively engaging the stem while the opposite second end of the latch is in operative engagement with the trigger, in the compressed state of the spring member;

driving the stem in the second direction opposite the first direction by release of the spring through de-energizing the electrically controllable trigger, in a shutdown mode; and biasing the latch towards the holding position in a released position by a latch return spring.

21. The method according to claim 20, further comprising: energizing the trigger mechanism utilizing a solenoid, or a shape memory alloy element.

22. The method according to claim 20, further comprising: testing the emergency shutdown functionality through:

driving the gate valve actuator further in the first direction during steady state operation mode by operation of the motor, against the force of the compressed force element, and returning the actuator in the steady state operation mode by the force of the compressed force element.

* * * * *

UNITED STATES PATENT AND TRADEMARK OFFICE
CERTIFICATE OF CORRECTION

PATENT NO. : 8,398,051 B2  
APPLICATION NO. : 12/918933  
DATED : March 19, 2013  
INVENTOR(S) : Grimseth et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 278 days.

Signed and Sealed this  
Eighth Day of April, 2014

Michelle K. Lee  
*Deputy Director of the United States Patent and Trademark Office*